Dec. 5, 1939.  R. M. WALKER ET AL  2,182,603
METER BOX
Filed April 8, 1938   5 Sheets-Sheet 1
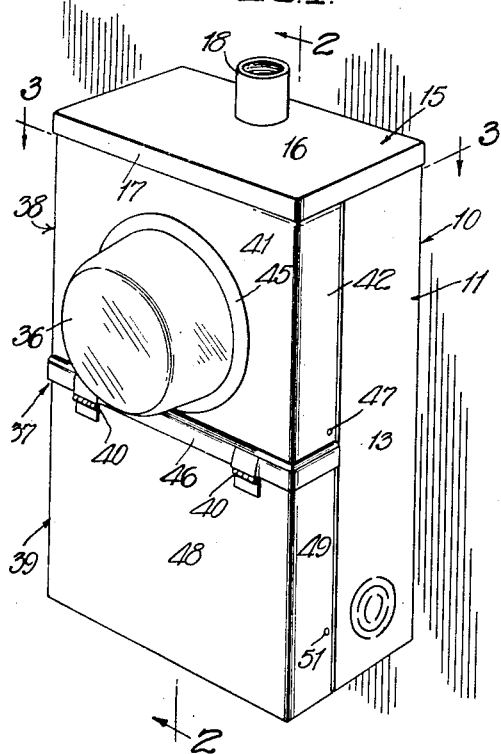
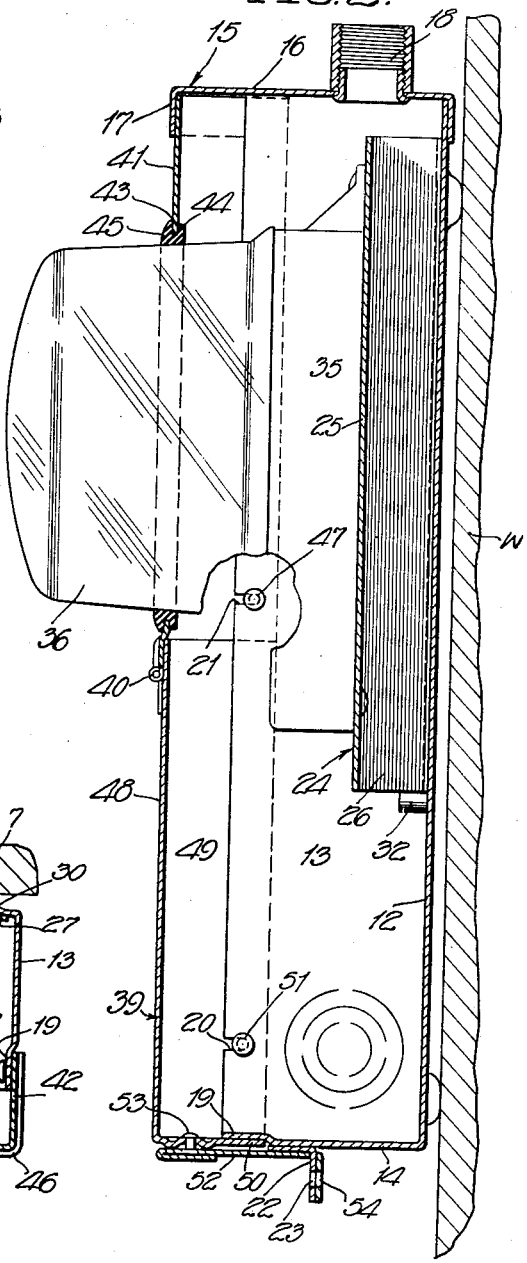
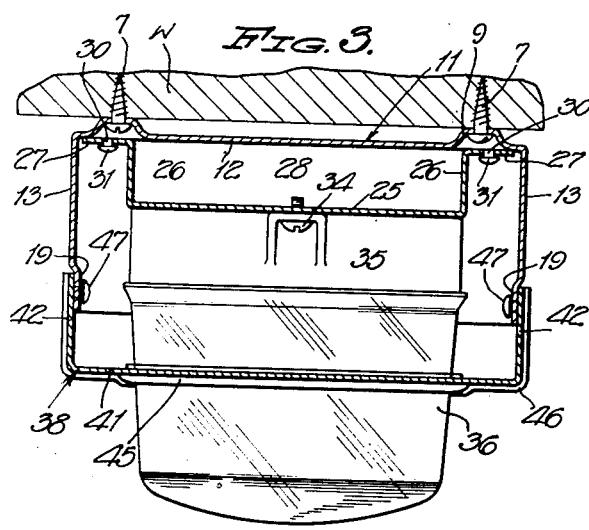
RALPH M. WALKER
CHARLES M. JENKINS
CARLL W. STRONG.
INVENTORS.
BY Ely + Pattison
ATTORNEYS.

Dec. 5, 1939.　　　R. M. WALKER ET AL　　　2,182,603
METER BOX
Filed April 8, 1938　　　5 Sheets-Sheet 2
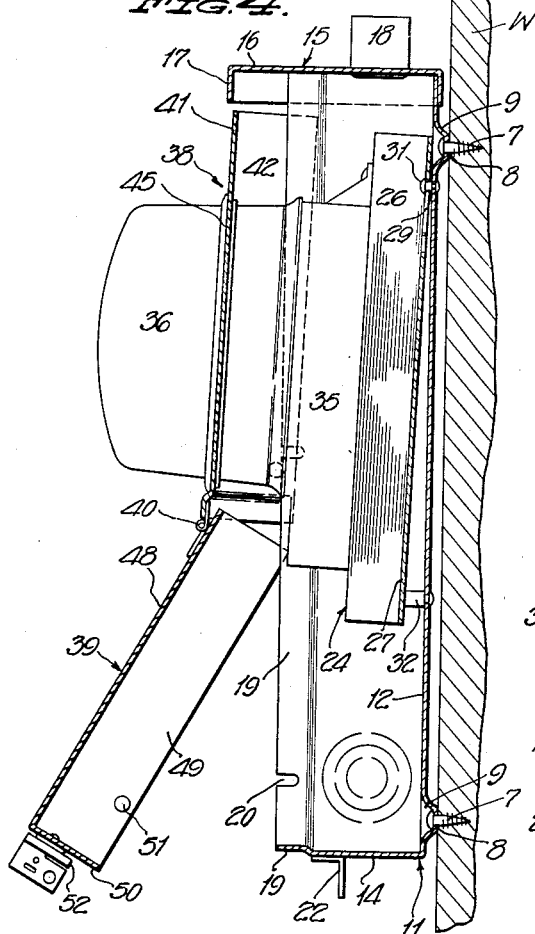
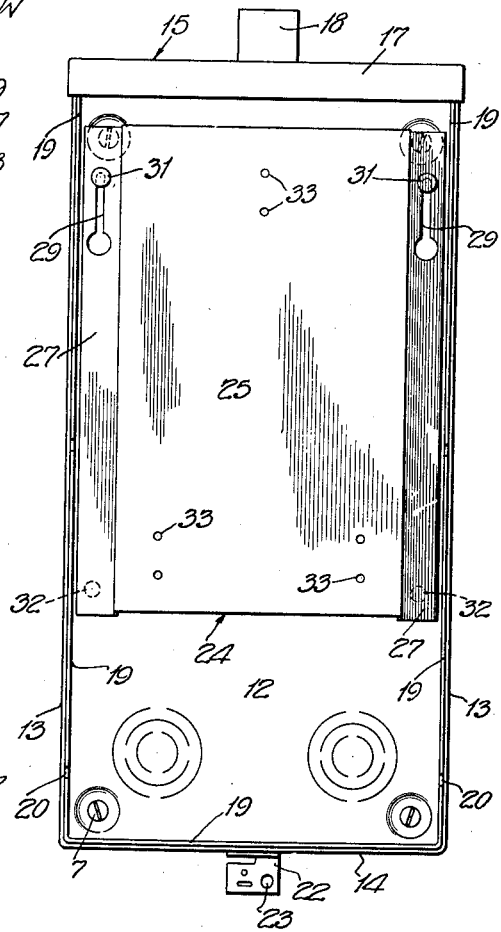
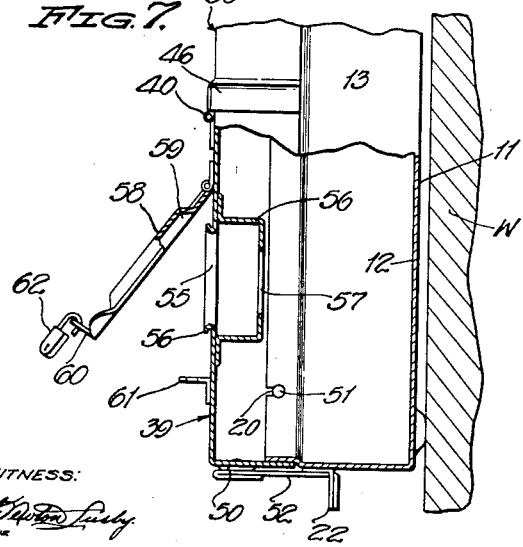
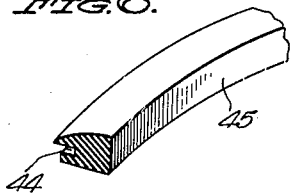
RALPH M. WALKER
CHARLES M. JENKINS
CARLL W. STRONG.
INVENTORS.
BY *Ely & Pattison*
ATTORNEYS.

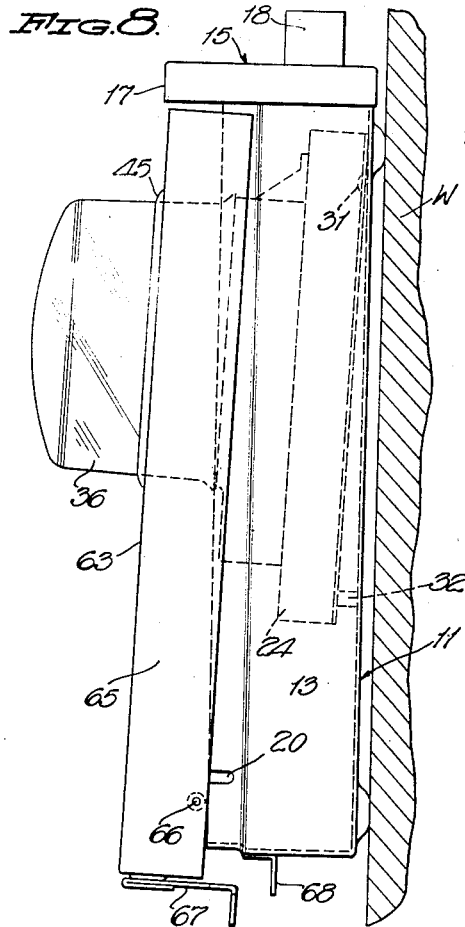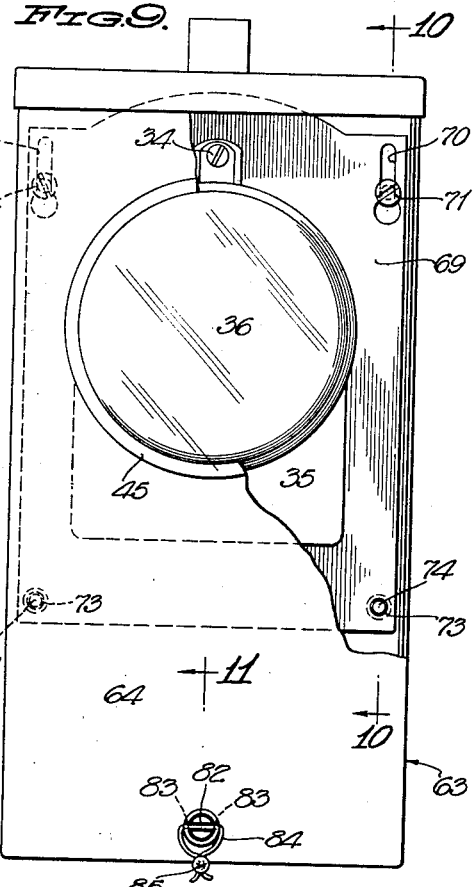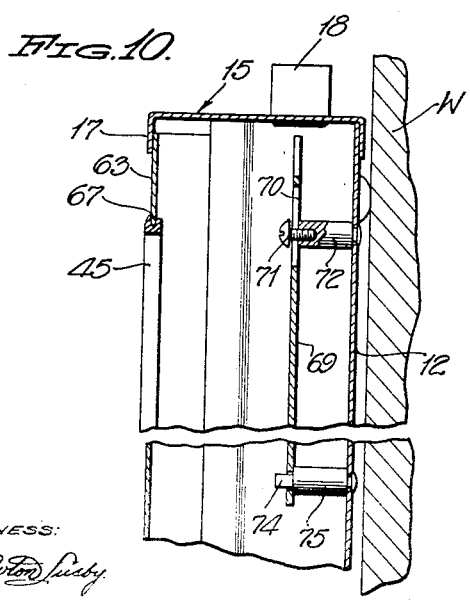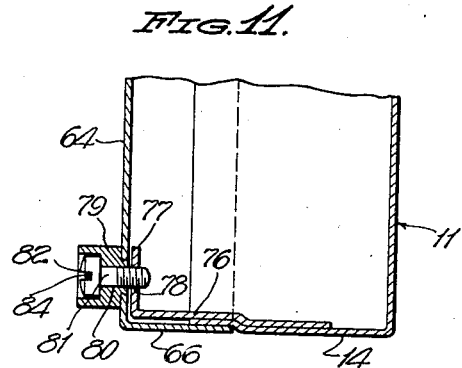

Dec. 5, 1939.      R. M. WALKER ET AL      2,182,603
METER BOX
Filed April 8, 1938      5 Sheets-Sheet 4
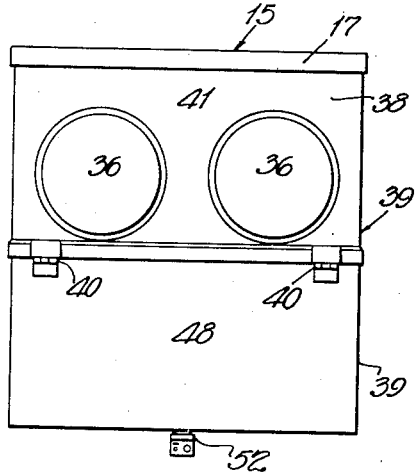
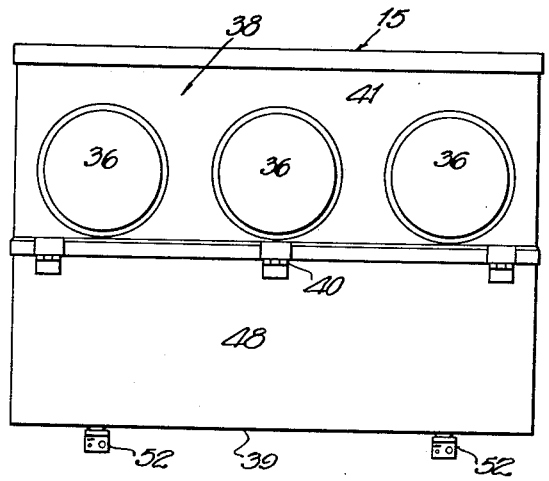
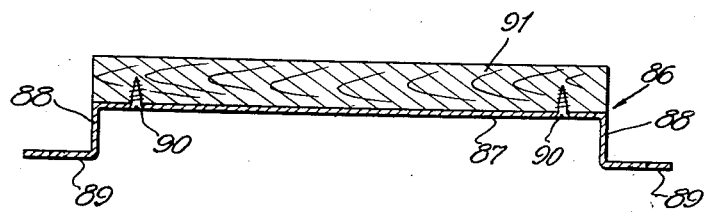
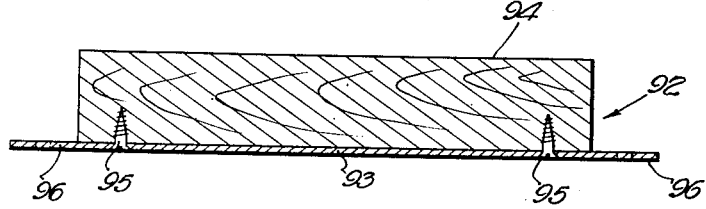
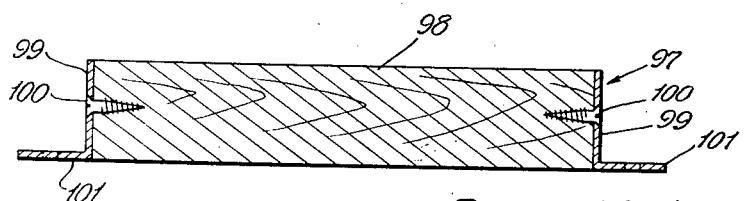
RALPH M. WALKER
CHARLES M. JENKINS
CARLL W. STRONG.
INVENTORS.
BY Ely & Pattison
ATTORNEYS.
WITNESS:

Dec. 5, 1939.　　　R. M. WALKER ET AL　　　2,182,603
METER BOX
Filed April 8, 1938　　　5 Sheets-Sheet 5
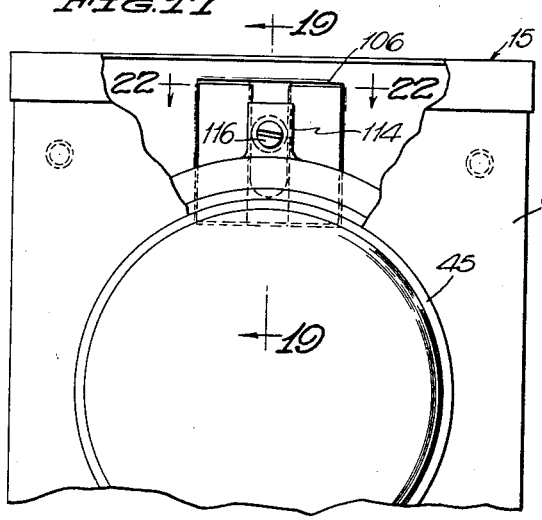
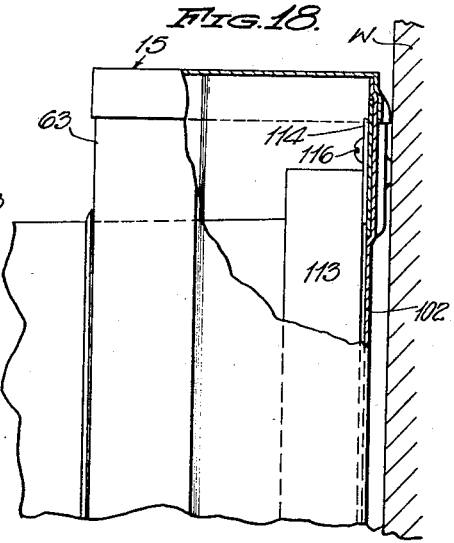
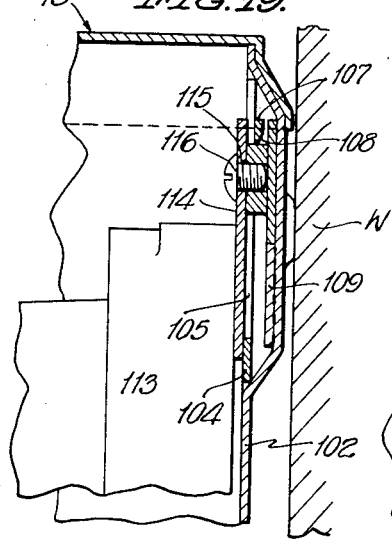
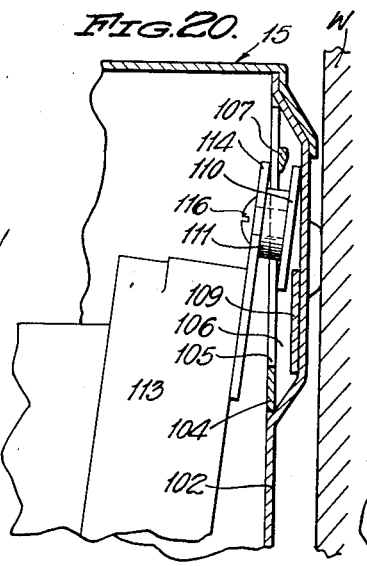
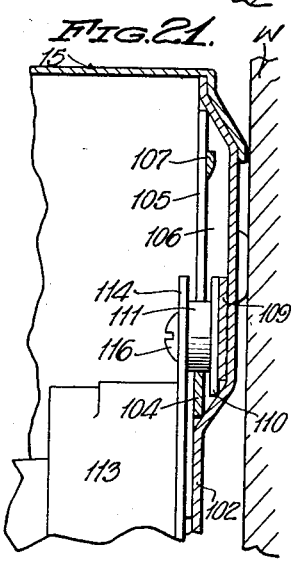
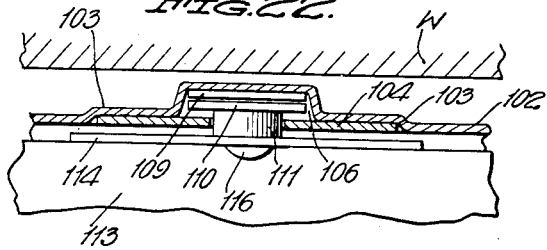
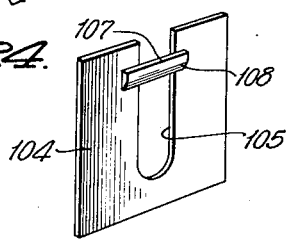
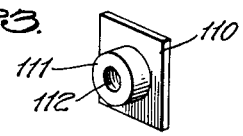
RALPH M. WALKER
CHARLES M. JENKINS
CARLL W. STRONG.
INVENTORS.
BY Ely & Pattison.
ATTORNEYS.

Patented Dec. 5, 1939

2,182,603

UNITED STATES PATENT OFFICE 2,182,603

METER BOX

Ralph M. Walker, Charles M. Jenkins, and Carll W. Strong, Atlanta, Ga., assignors to Walker Electrical Company, Atlanta, Ga.

Application April 8, 1938, Serial No. 200,864

14 Claims. (Cl. 175—220)

This invention relates to improvements in weather-proof boxes for electric meters.

One of the important features of the invention resides in a weather-proof box for outdoor use in which an electric meter may be locked to prevent unauthorized tampering, and which may be viewed for reading at will by the representative of an electric service company or by the subscriber of the electric service. This convenience is not broadly new, for in Walker Patent No. 2,007,065, there is shown a lockable weatherproof meter box having a window opening in alinement with the dials of the meter, but to properly house the entire meter in the box it was necessary to provide a forwardly projecting extension on the front cover, and accurately mount the meter in the box so that the face of the meter alined with a window opening in the extension. However, this invention differs from the Walker patent in that it enables the face of the meter to protrude through the front of the box, which eliminates the labor and material costs necessary to form a front extension.

Another feature of the invention is to provide a weather-proof meter box of the type in which the cover is slid into its locking position with respect to the casing, and which manual act of sliding the cover to closed position, also serves to slide the meter to its supporting position upon and within the casing.

A further feature of the invention is the provision of a weather-proof meter box in which the face portion of the meter protrudes through the front thereof, and a tight joint is provided between the walls of the opening in the front of the box and that portion of the meter protruding therethrough to effect a rain tight seal.

A further feature of the invention resides in a lockable meter box having the front cover divided into an upper section through which the face portion of the meter extends, and a lower hinged section which may be opened by an authorized person to obtain access to the interior of the meter box without disturbing the position of the upper cover section or meter. Such type of front cover enables the wiring of the meter after it is properly positioned in the meter box.

A further feature of the invention is the provision of a meter box having a sliding cover through which the face of a meter extends, the meter being anchored upon a bridge support slidably connected to the upper portion of the box casing, the bridge support being of such novel construction as to provide a wiring space between the support and the rear wall of the box casing which facilitates wiring of the meter through the top of the box to allow the wires to be brought downwardly behind the meter to the bottom of the box and the wires properly connected to the meter by opening the lower swinging section after the front cover and meter have been positioned relative to the casing.

With these and other objects in view, the invention resides in the certain novel construction, combination and arrangement of parts, the essential features of which are hereinafter fully described, are particularly pointed out in the accompanying drawings, and in which:

Figure 1 is a perspective view of the improved meter box having a front cover of the hinged section type showing the cover in locked position.

Figure 2 is an enlarged vertical longitudinal sectional view on the line 2—2 of Figure 1.

Figure 3 is an enlarged horizontal sectional view on the line 3—3 of Figure 1.

Figure 4 is a vertical longitudinal sectional view showing the cover and meter preparatory to the upward sliding of the cover to move the same and the meter to final locking position.

Figure 5 is a front elevational view of the box casing with the cover and meter removed, the meter support being shown in the same position as illustrated in Figure 4.

Figure 6 is a detail sectional perspective view of the meter face ceiling gasket.

Figure 7 is a detail vertical sectional view of a box similar to that shown in the preceding figures, but in which the front cover is provided with a circuit breaker handle compartment.

Figure 8 is a side elevational view of a meter box constructed in accordance with the invention but in which the front cover is of the single section type and about to be slid to its locking position.

Figure 9 is a front elevational view of a modified form of meter support and cover fastener with parts broken away and illustrating the front cover in fully closed position.

Figure 10 is a detail vertical sectional view on the line 10—10 of Figure 9.

Figure 11 is an enlarged detail vertical sectional view on the line 11—11 of Figure 9.

Figure 12 is a front elevational view of a meter box similar to that shown in Figure 1 but constructed for two meters.

Figure 13 is a front elevational view of a meter box similar to that shown in Figure 1 but constructed for three meters.

Figures 14, 15, and 16 are detail cross sectional views of modified forms of meter supports.

Figure 17 is a fragmentary front elevational view with parts broken away illustrating a modified form of sliding meter support with the cover in closed position.

Figure 18 is a fragmentary side elevational view with parts broken away.

Figure 19 is an enlarged vertical sectional view on the line 19—19 of Figure 17.

Figure 20 is a view similar to Figure 19, but illustrating the manner in which the meter is slid into or out of engagement with its hanger.

Figure 21 is a view similar to Figure 20 but illustrating the meter supported by its hanger but prior to the association of the cover with the meter and casing.

Figure 22 is a horizontal sectional view on the line 22—22 of Figure 17.

Figure 23 is a detail perspective view of the locking plate.

Figure 24 is a detail perspective view of the guide member.

Like reference characters refer to similar parts throughout the several forms of the invention disclosed herein.

Referring to the drawings by reference characters, and at present to the form of the invention shown in Figures 1 to 5 inclusive, the numeral 10 designates the improved lockable weather-proof meter box in its entirety and which includes a rectangular shaped casing 11 constructed of sheet metal and which casing is open at its front. The casing 11 is of rectangular box-like configuration and includes a rear wall 12, opposed side walls 13—13 and a bottom wall 14. The top of the casing is closed by a cap 15 which includes a flat top wall 16 of rectangular shape in plan and downwardly depending side flanges 17 which embrace the top of the rear wall 12 and side walls 13—13. The cap 15 is fixedly secured to the rear and side walls of the casing by welding the lapping flanges 17 to the said walls. The cap 15 is of such size as to project forward and overhang the open front of the casing 11 for the purpose to be presently explained.

The top wall 16 has a threaded nipple 18 rising upwardly therefrom and which nipple opens into the interior of the casing 11. The nipple 18 provided a water tight connection between the meter box and the conduit pipe through which the wires to the meter box pass. In some instances the nipple 18 may be dispensed with, for certain users may desire to bring wires in from the bottom of the meter box 10 through knock-outs provided in the side walls 13 for such purposes.

Screws 7 pass through openings 8 in the rear wall 12, and enter a wall or other like supporting structure W. The heads of the screws 7 are disposed within countersinks 9 which are formed by pressing the metal rearwardly, and which rearwardly pressed portions act as feet for abutting engagement with the wall W.

Whereas, we have illustrated and described a specific form of wall mounting for the meter box 10, it is to be understood that other standard forms of mountings may be used for the mounting of the meter box upon a wall, pole, cross-arm or other supporting structure.

The side walls 13 and the bottom wall 14 terminate at their outer free edges in inwardly offset flanges 19, the flanges in the side walls 13 extending to the top wall 16 whereby to provide a space between the flanges 19 of the side wall and the adjacent flanges 17 of the cap 15. Extending inwardly from the flanged edges of the side walls 13 are lower notches 20 and upper notches 21. Fixed to the bottom wall 14 and depending therefrom is a keeper member 22 having an opening 23 therein.

Slidably supported upon the rear wall 12 is a meter support 24, and in this form of the invention, the support is referred to as the bridge type of support and includes a front panel wall 25, rearwardly extending side walls 26—26, and outwardly extending flanges 27—27, the said flanges being parallel to the panel wall 25. In cross section, the bridge support 24 is of substantially U-shape or channel shape in cross section as best illustrated in Figure 3, to provide a wire passage 28 between the rear wall 12 of the casing and the front panel wall 25. The flanges 27—27 are provided adjacent their top ends with inverted key hole shaped slots 29—29 through which the shanks 30 of headed pins 31 extend. The headed pins 31 extend inwardly from the rear wall 12 adjacent the top of the rear wall and are so located that the bridge support 24 may be disconnected from the casing to facilitate the mounting of the meter upon the bridge support and to enable wiring of the meter and box, preparatory to the final mounting of the meter within the box and the subsequent application of the cover presently to be described. The slots 29 are of such length and the pins are located in such a position with respect to the top of the casing that the top of the bridge support 24 will almost strike the top of the casing when the enlarged portions of the key hole slots 29 reach the plane of the headed pins 31.

When the bridge support 25 is in its lowermost position as shown in Figures 4 and 5 of the drawings, the lower edge of the same is disposed below a pair of rest pins 32—32, which pins are disposed in vertical alinement with the respective flanges 27—27 of the bridge support. By reference to Figure 3 of the drawings, it will be seen that the heads of the pins 31 are spaced from the rear wall for a distance greater than the thickness of the flanges 27 to enable the limited outward and inward swinging or tilting movement to be imparted to the meter support 24 and enables the support to be slid downwardly over and below the plane of the pins 32. When slid upwardly to a meter supporting position, the lower end of the meter support 24 is swung inwardly toward the rear wall 12 to cause the bottom ends of the flanges 27 to rest upon the respective pins 32 as shown in Figure 2 of the drawings.

The panel wall 25 of the bridge support 24 is provided with suitably spaced threaded openings 33 which receive fastening screws 34 employed for securing an electric meter or like instrument 35 to the support 24. The electric meter 35 may be of any well known type having a forwardly projecting face 36, the said face projecting well beyond the plane of the open front of the casing 11.

The construction thus far described may be used in association with either a twin section front cover shown in Figures 1 to 7 inclusive and designated in its entirety by the numeral 37, or a one-piece cover as illustrated in Figures 8 to 11 inclusive, which latter cover will be specifically described hereinafter.

The twin section cover 37 includes an upper cover section 38 and a lower hinged cover section 39, the hinged connection between the two sections being designated at 40.

The upper section 38 includes a front wall 41 and inwardly extending side flanges 42. The front wall 41 is provided with a round opening 43, the walls of which fit into a groove 44 of a rubber yieldable sealing gasket 45. The lower edge of the front wall 40 and the side flanges 42 terminate in outwardly offset downwardly extending flanges 46 which lap the top edges of the lower hinge section 39 to provide a water-tight joint between the two sections. Extending inwardly from the side flanges 42 are headed pins 47 which are adapted to enter the notches 21 in the side walls 13 of the casing when the cover is in position upon the casing as shown in Figure 2 of the drawings.

The lower hinge section 39 includes a front wall 48, side flanges 49, and a bottom flange 50. When the sections 38 and 39 are in vertical alinement, they cooperate to provide the closure 37 which is of a size to snugly fit over the open front of the casing 11, with the top ends of the front wall 41 and side flanges 42 of the upper section 38 fitting into the cap 15 and embraced by the depending flanges 17 of the said cap. Side flanges 42 of the upper section 38 and the side flanges 49 of the lower section 39 snugly embrace the inwardly offset flanges 19 of the side walls 13 of the casing, while the bottom flange 50 of the lower section 39 fits beneath the flange 19 on the bottom wall 14 of the casing and illustrated in Figure 2 of the drawings.

Extending inwardly from the side flanges 49 are headed pins 51 which enter the respective slots 29 in the side walls 13—13 of the casing when the hinged cover section 39 is in closed position. The headed pins 47 and 51 which respectively enter the notches 21 and 29 act to support the weight of the cover when the cover is in fully closed position. If the lower hinge section 39 is swung outwardly, the pins 51 are disengaged from the respective notches 29, but the weight of the cover is then supported by the upper pins 47 disposed in the slots 21.

A latch 52 is pivoted to the bottom flange 20 of the hinge section 39 as at 53, and the said latch is adapted to be swung into engagement with the keeper 22 so as to bring the openings 54 in the latch into alinement with the opening 23 of the keeper, whereby a padlock or seal may be passed through the openings to secure the cover against unauthorized removal from the casing.

In Figure 4 of the drawings there is illustrated a position of the cover and meter support just prior to the sliding of the cover and the meter support to cover closing and meter supporting position. Figure 4 also represents the position of the parts when removing the cover from the casing, but at present, assume that it represents the application of the cover to a position to close the open front of the casing 11. When applying the cover 37 into position, the same is positioned over the open front of the casing 11 with the projecting face 36 of the meter 35 extending through the opening in the upper section 38 of the cover, it being understood that the meter support 24 is in its lowered position as shown in Figures 4 and 5 with the lower end tilted forwardly due to the inner faces of the flanges 27 resting against the inner ends of the pins 32. The cover 37 is now slid upwardly to cause the upper ends of the cover to fit into the top cap 15 and when such position is reached, the lower edges of the flanges 27 have cleared the pins 32, whereupon inward pressure upon the cover will cause the cover and the meter support 24 to move inwardly, at which time, the pins 47 enter the notches 21 and the lower ends of the flange 27 rest on the pins 32 as shown in Figure 2 of the drawings. The twin section cover is now properly alined and supported by the casing 11 and the closure operation may be completed by swinging the hinge section 39 inwardly against the casing, whereupon the pins 51 enter the notches 29 and by manually swinging the pivoted latch 52 into engagement with the keeper 22, the cover may be locked or sealed by passing a lock or seal through the registering openings 23 and 54.

The type of bridge support 24 enables wiring of the meter after it has been mounted on the support and the cover applied in position over the casing, for wires led in through the nipple 18 may be brought downwardly through the wire passage 28 into the lower portion of the casing, where they are accessible to the electrician by merely swinging the door section 39 outwardly. The hinged door 39 also permits access to the wiring and to the meter without necessitating the separation of the cover 37 from the casing 11. However, should it be desired to remove the entire cover 37, it is only necessary to swing the hinged cover section 39 outwardly, then pull outwardly and downwardly upon the upper section 38 to first cause the pins 21 to move out of the notches 47 and to cause the lower ends of the flanges 27 of the bridge support 24 to clear the free ends of the pins 32. When the cover 37 has been slid downwardly together with the bridge support 24, the downward movement being limited by the pins 31 striking the top ends of the slots 29, the top edge of the upper section 38 is clear of the flanges 17 of the cap 15 as shown in Figure 4, whereupon outward pulling upon the cover will separate the same from the protruding face 36 of the meter 35.

The yieldable sealing gasket 44 provides a water tight seal between the walls of the opening 43 and the protruding face of the meter, it being desirable to prevent rain water, and other precipitation from entering the meter box.

In Figure 7 of the drawings we have illustrated a twin section cover identical to the cover 37 hereinbefore described, but in which the lower hinge section 39 is provided with a door opening 55, the edges of the opening being bent outwardly into a flange 56. Fixedly mounted on the inner side of the hinged door section 39 is a box-like housing 58, the inner wall having a vertical elongated slot 57 through which the manual actuating element of a circuit disconnecting device may extend, the said device adapted to be mounted within the casing 11 adjacent the bottom thereof for opening and closing the circuit in which the meter contained in the meter box is arranged. Hinged to the front of the hinge cover section 39 is a weather proof door 58, the same having a recessed portion 59 for receiving the weather proof flange 55 to seal the joints between the door opening and the door 58. The bottom of the door is provided with an ear 60 which when closed registers with an ear or keeper 61 mounted on the cover section 39 and a lock or seal 62 may be passed through openings in the registering ears to secure the door 58 in closed position against unauthorized opening. By means of the door 58, access may be had to the circuit breaker handle without necessitating the breaking of the seal or opening of the lock which is applied to prevent unauthorized removal of the cover, or opening of the cover section 39.

In Figure 8 of the drawings, there is illustrated the same construction of casing 11 and sliding bridge support as set forth in the preceding figures, but instead of a twin section type cover, there is illustrated a single one-piece cover 63 including a front wall or panel 64, side flanges 65 and a bottom flange 66. The front wall 64 is provided with an opening 67 in which is set the gasket 45 heretofore described. Extending inwardly from the side flanges 65 adjacent the bottom thereof are headed pins 66 which enter the notches 20 in the side walls 13 of the casing 11. The bottom flange 66 in Figure 8 is provided with a pivoted latch 67' adapted to be brought into engagement with a keeper 68 when the cover is in a fully applied position to enable a lock or seal to be applied to the registering openings in the latch 67' and keeper 68. The application of the cover 63 to the casing 11 is the same as that described for the twin section cover 37, with the exception that the cover 63 is an integral unit and does not require the swinging of a door section such as shown at 39 in the preceding figures.

In Figures 9 to 11 inclusive, there is illustrated a slightly modified form of meter support and a modified form of cover lock, but aside from these features, the construction is the same as that heretofore described.

In Figures 9 to 11 inclusive, the meter support constitutes a flat substantially rectangular shaped panel 69 on which the meter 35 is mounted such as by screws 34. The upper portion of the panel 69 is provided with inverted key-hole shaped slots 70 through which the shanks of screws 71 pass. The screws 71 thread into inwardly extending posts 72 fixed to the rear wall 12 of the casing 11. In this form of bridge support, instead of having the bottom of the support rest upon pins as heretofore described, the meter support 69 is provided with openings 73 which receive the outer reduced ends 74 of posts 75 extending inwardly from the rear wall 12. The meter support 69 when in meter supporting position as illustrated in Figures 9 and 10 is held spaced from the rear wall 12 by the posts 72 and 75 to provide a wiring passage between the meter support and the rear wall of the casing and which is the equivalent to the passage 28 hereinbefore referred to. In the form of meter support 69, the same function takes place during the application of the cover to the casing and its removal therefrom as described for the operation of the channel shaped meter support 24.

In Figures 9 and 11, there is shown a modified form of lock for securing the cover to the casing. This form of lock or seal includes a bracket 76 fixedly secured to the bottom wall 14 of the casing 11 and which bracket extends forwardly of the open front of the casing and terminates in an upstanding ear 77, the said ear having a threaded opening 78 therein. Fixed in the front wall 64 of the cover is a cup shaped member 79 having an opening 80 therein which alines with the threaded opening 78 when the cover is in closed position. A headed screw 81 is passed through the opening 80 and threaded into the opening 78, the head of the screw being provided with a kerf 82 adapted to register with openings 83 provided in opposite walls of the cup shaped member 79 whereby a wire 84 may be passed through the openings 83 and kerf 82 after the screw 81 has been screwed home, and the free ends of the wire twisted and held together by a seal 85. It will thus be seen that the seal prevents access to the screw 81 without detection to prevent unauthorized removal of the screw and removal of the cover.

In Figures 12 and 13 of the drawings, there is illustrated gang meter boxes constructed in accordance with the invention and equipped with the twin section type cover 37. In Figure 12 of the drawings, there is shown a two gang meter box, and in Figure 13 a three gang meter box.

In Figures 14 to 16 inclusive, there is illustrated modified forms of the meter support. In Figure 14, the support in its entirety is designated 86, and includes a metal bridge 87 having inwardly extending side walls 88 and outwardly extending flanges 89 which are the equivalent to the flanges 27 hereinbefore described. Fixed to the front side of the bridge panel 87 by screws 90 is a wood panel 91 to which the meter to be supported is directly attached.

In Figure 15 there is shown a meter support designated in its entirety by the numeral 92 and which includes a flat metal panel 93 having a wood panel 94 secured on the outer side thereof by fastening screws 95. The sides of the wood panel 94 terminates short of the sides of the metal panel 93 to provide flanges 96 equivalent to the flanges 27 hereinbefore mentioned. The meter to be supported by the support 92 is directly attached to the wood panel 94.

In Figure 16 the meter support is designated in its entirety by the numeral 97 and includes a wood panel 98 having L-shaped metal strips 99 fastened thereto by screws 100. The flanges 101 of the L-shaped strips 99 extend outwardly from opposite sides of the wood panel 98 and are the equivalent to the flanges 27 hereinbefore described. In this form, the meter to be supported is directly attached to the outer face of the wood panel 98.

In Figures 17 to 23 inclusive, a modified form of sliding support is provided for the meter, and in this form, a slight change is made in the construction of the upper portion of the meter casing. In this form of the invention, the upper portion of the rear wall 102 of the meter casing is pressed out rearwardly to provide a rearwardly stepped shoulder 103 to which is welded a hanger plate 104, the said plate having a vertical slot 105 extending downwardly from the top edge of the plate. The offset portion formed in the rear wall is further stepped rearwardly to provide a vertical recess 106, the rear wall of the recess being disposed in suitable spaced relation to the hanger plate 104. Welded to the rear side of the hanger plate 104 and bridging the slots 105 is a stop bar 107 having a lower rearwardly facing beveled portion 108. Welded to the inner side of the rear wall of the recess 106 is a rest plate 109, the thickness of the plate 109 being approximately less than one half the distance between the inner face of the hanger plate 104 and the rear wall of the recess 106. Slidable vertically within the recess and captively held therein is a flat head 110 which is square is shown in Figure 23 and integral with and extending inwardly from the head 110 is a boss 111 having an internally screw threaded bore 112. The head 110 is loosely slidable vertically within the recess and may, by forward tilting, be slid from the lower end of the recess to the upper portion thereof to seat upon the rest plate 109 as indicated in Figure 19 of the drawings. The boss 111 projects through the slot 105 in the hanger plate and it is by means of the boss that the meter to be slidably supported is connected to the flat head 110. The meter in this instance is designated 113, and is provided with a hanger bracket 114 which is fixedly secured to the rear of the meter and projects above the top thereof. The projecting portion of the bracket 114 is provided with an opening 115 for the passage of a fastening screw 116, the said screw threading into the threaded bore 112 of the boss 111. When the meter hanger bracket 114 is thus connected to the sliding flat head 110, and the cover positioned over the face of the meter and slid upwardly into position over the open face of the meter casing, the flat head 110 will slide upwardly, and when reaching the limit of its upward movement caused by the boss 111 striking the bridge bar 107, the rearward movement of the meter caused by the cover being finally shoved inwardly to closed position, will cause the bottom edge of the flat head 110 to seat upon the rest 109, thus supporting the weight of the meter in its proper position within the meter box. In this form of the invention either the single type cover 63 or the twin section type cover 37 may be associated with the meter casing and for illustrative purposes, the single one piece cover 63 is shown in Figures 17 and 18.

From the foregoing description, it will be seen that in all the forms of sliding meter supports, it is possible to impart a slight forward and rearward tilting movement to the support as the cover with the protruding face of the meter extending therethrough is slid into and out of position relative to the meter casing. Also present in all forms is a means for supporting the weight of the meter support upon the casing when it reaches its proper meter supporting position. By reason of the sliding meter support, it is possible to permit the front face of a meter to protrude through a slidable cover without sacrificing any of the weather proof features of a slide cover type meter box.

While there is shown several modifications of the invention, it is to be understood that such other changes in construction may be resorted to as come within the scope of the appended claims.

Having thus described the invention, what we claim as new and desire to secure by Letters Patent of the United States, is:

1. A meter box comprising in combination, a box-like casing open at its front, a meter support, means for mounting said meter support within said casing for vertical sliding movement relative thereto, a front cover associated with the open side of said casing for vertical and inward sliding movement to close the open front thereof, a meter fixedly mounted on said meter support and having its face protruding through an opening in said cover, and means for securing said cover against sliding movement.

2. A weather proof meter box comprising in combination, a casing open at its front, a removable cover vertically slidable to a closed position over the open front of said casing and having an opening therein, a meter having its face protruding through said opening, a sealing gasket for sealing the joint between the face of said meter and the walls of said opening, means for supporting said meter within said casing for vertical sliding movement, and means for securing said cover in closed position over the open front of said casing against sliding movement.

3. A meter box comprising in combination, a casing open at its front, a removable cover vertically slidable to a closed position over the open front of said casing to close the same and having an opening therein, and a vertical slidable meter support mounted within said casing, a meter fixedly mounted on said meter support with its face extending through said opening, whereby said meter support may be vertically slid to meter supporting position simultaneously with the vertical sliding of the cover to closing position relative to said casing.

4. A meter box comprising in combination, a casing open at its front, a removable cover vertically slidable to a closed position over the open front of said casing to close the same and having a meter face receiving opening therein, and a meter support mounted for vertical sliding movement within said casing on which a meter is adapted to be mounted with its face extending through said meter face opening, whereby said meter support may be slid vertically upward to meter supporting position simultaneously with the vertical upward sliding of the cover to closing position relative to said casing, and rest means on said casing for receiving said meter support when the same is moved to meter supporting position.

5. A meter box comprising in combination, a casing open at its front, a removable cover fitting over the open front of said casing including an upper cover section and a lower hinged cover section, the upper section having an opening therein, releasable interlocking means between the upper cover section and said casing for securing the same in position over the open front thereof, a meter slidably supported within the upper portion of said casing with its face protruding through said opening, and lock means for securing said lower cover section in closed position over the open front of said casing.

6. A meter box comprising in combination, a casing open at its front, a removable cover fitting over the open front of said casing including an upper cover section and a lower hinged cover section, and interlocking means between said upper cover section and casing for securing the upper cover section in closed position over the open front of said casing for preventing sliding and outward movement of said upper section relative to said casing, and means for locking said lower cover section in closed position against said casing.

7. A meter box comprising in combination, a casing open at its front and having an opening in the top thereof, a removable cover fitting over the open front of said casing including an upper cover section and a lower hinged cover section, interfitting means connecting the upper section with said casing, a meter support of channel shape in cross section mounted on the upper portion of the rear wall of said casing whereby a meter mounted on said support may be wired by leading the wires down through the opening in the top of said casing and down through the space between said meter support and the rear wall of said casing to the lower portion of said casing to make the wires accessible to a person reaching into the lower portion of said casing when said lower cover section is open, and means for securing said lower cover section in closed position.

8. A meter box comprising in combination, a casing open at its front, a removable cover having an opening therein through which the face of a meter is adapted to protrude, a meter support, means for mounting said meter support on the inner side of the rear wall of the casing for vertical sliding movement relative thereto, said cover adapted to be slid upwardly relative to said casing to close the open front thereof, interfitting means between said cover and said casing for supporting said cover on said casing when said cover has been vertically slid to closing position, and means for supporting said meter support in meter supporting position when moved thereto by reason of the face of the meter which is mounted on said support protruding through said opening and the vertical sliding of said cover to closing position.

9. In a meter box, a casing open at its front, a meter panel support slidably mounted and mounted for tilting movement on the rear wall of said casing to facilitate a limited vertical sliding, and outward and inward swinging movement of said meter panel support relative to the rear wall of said casing, and rest elements extending inwardly from the rear wall of said casing on which the bottom edge of said panel support rests when the same is slid upwardly within said casing and swung inwardly the rear wall of said casing.

10. In a meter box, a casing open at its front, a meter support comprising a panel section of channel shape in cross section, flanges extending outwardly from opposite sides of said panel section having vertical elongated slots therein adjacent the top thereof, headed pins extending forwardly from the rear wall of said casing and passing through said slots and loosely connecting the upper portion of said meter support to the rear wall of said casing for tilting and vertical sliding movement, and rest elements extending inwardly from the rear wall of said casing on which the lower end of said meter support rests when the same is slid upwardly and swung inwardly to a stationary meter supporting position.

11. In a meter box, a casing open at its front, a meter supporting panel, means for slidably and tiltably connecting the upper portion of said meter panel to the rear wall of said casing to facilitate the limited vertical sliding and outward and inward swinging movement of said meter panel, said meter panel having spaced openings provided therein adjacent the bottom thereof, and pins extending inwardly from the rear wall of said casing and respectively entering said openings when said meter panel is slid upwardly and swung inwardly relative to said casing for supporting said meter panel in a raised stationary meter supporting position.

12. In a meter box, a casing open at its front and having a recess in the rear wall adjacent the top thereof, a fixed bridge plate overlying said recess and having a vertical slot therein, a meter, a hanger bracket carried by said meter, a head carried by said bracket and extending through said slot for connecting said meter to the rear wall of said casing for vertical sliding movement relative thereto, and a rest for receiving and supporting said head when said meter is slid upwardly to meter supporting position.

13. In combination, a meter box of the type having a box-like body open at its front and a top wall extending forward beyond the side walls of the body and provided with depending front and side flanges, a removable cover having side flanges, said cover adapted to be applied to the open front of said body by engaging the side flanges thereof with the side walls of said body by tilting and sliding the same upwardly so that the top of the cover engages the inner sides of the depending front and side flanges, means for securing said cover in closed position; said cover having a meter face opening therein, a meter support slidably mounted and mounted for tilting movement within said body, a meter fixedly mounted on said meter support with its face extending through the opening in said cover, whereby said meter support and meter may be tilted and slid with said cover during its application to and removal from said body, and means on said body engageable by said meter support when the same is slid upwardly to the limit of its upward sliding movement with said cover for receiving and supporting the weight of said meter support and meter carried thereby.

14. In combination, a meter box of the type having a box-like body open at its front and a top wall extending forward beyond the side walls of the body and provided with depending front and side flanges, a removable cover having side flanges, said cover adapted to be applied to the open front of said body by engaging the side flanges thereof with the side walls of said body by tilting and sliding the same upwardly so that the top of the cover engages the inner sides of the depending front and side flanges, means for securing said cover in closed position; said cover having a meter face opening therein, a meter support captively and slidably mounted and mounted for tilting movement on the rear wall of said body, a meter fixedly mounted on said meter support and having a forwardly projecting face snugly fitting within the meter face opening, whereby said cover, meter support, and meter may be tilted and slid upwardly as a unit during the application and removal of the cover from said body, and rest means engageable by said meter support upon the limit of its upward sliding movement to relieve the cover of the weight of the meter and meter support when the cover is in closed position.

RALPH M. WALKER.
CHARLES M. JENKINS.
CARLL W. STRONG.